Jan. 9, 1934.    R. D. HICKOK    1,942,401
RADIO TUBE TESTER
Filed Feb. 17, 1932
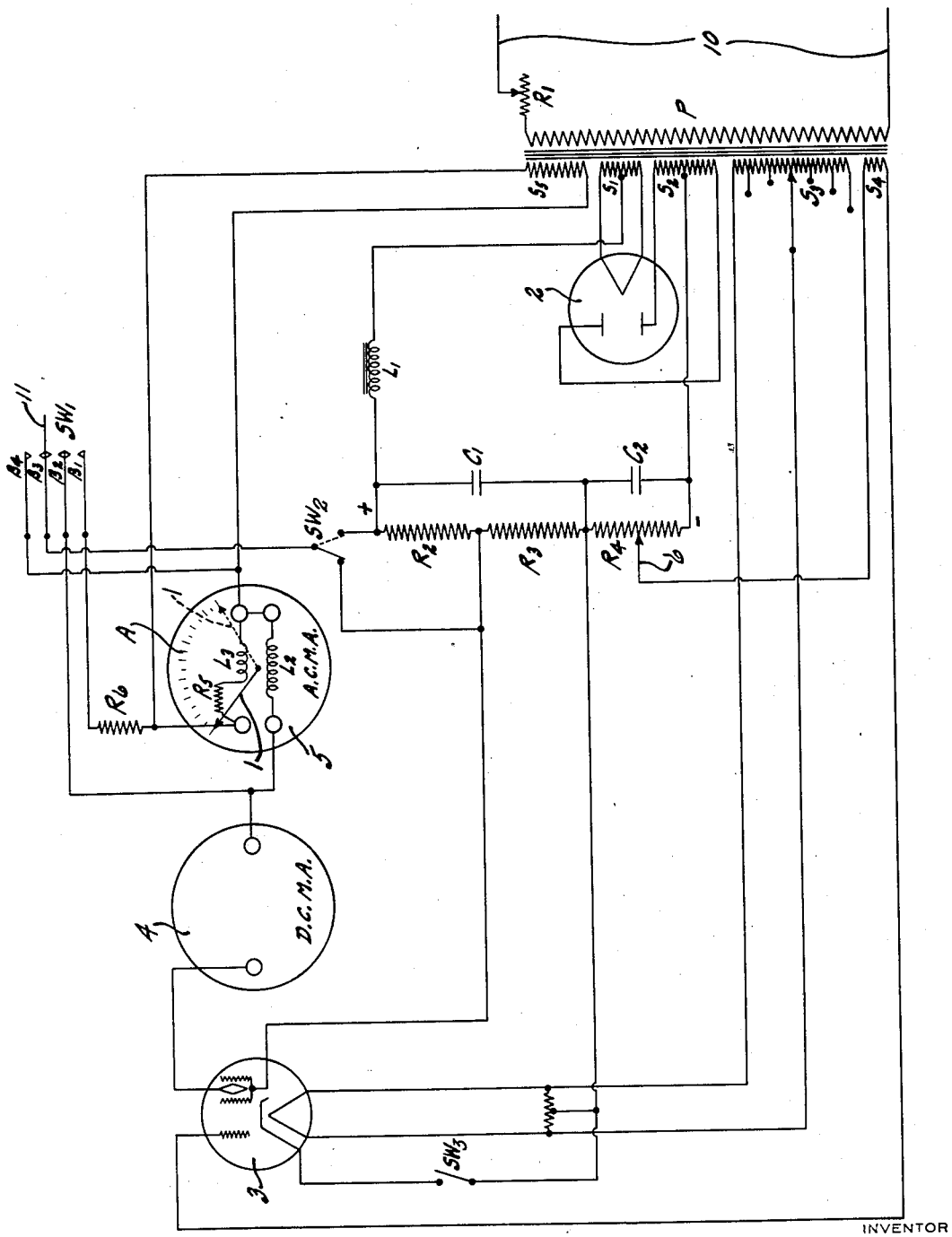
INVENTOR
Robert D. Hickok
BY
Brockett, Hyde, Higley & Meyer
ATTORNEYS Patented Jan. 9, 1934

1,942,401

UNITED STATES PATENT OFFICE 1,942,401

RADIO TUBE TESTER

Robert D. Hickok, Cleveland, Ohio, assignor to Cleveland Patents, Incorporated, Cleveland, Ohio, a corporation of Ohio Application February 17, 1932. Serial No. 593,509

1 Claim. (Cl. 250—27)

This invention relates to method and apparatus for testing radio or electron tubes and particularly for the purpose of simultaneously measuring and indicating directly both the plate current and mutual conductance of the tube, its object being to provide a simple and convenient form of apparatus embodying in a single portable unit all the necessary devices for such simultaneous measurement and indication, together with means for utilizing an alternating source of current for the power supply. More particularly, the invention has for its object to provide a measuring instrument constructed and operated as aforesaid, provided with means whereby either or both of the plate and grid voltages may be varied to meet any required conditions, in addition to which the tube to be tested may be operated under conditions which simulate its practical use, to wit, by the application to the grid of a periodically varying or alternating current or modulating effect simulating usual signal effects ordinarily applied to the grid, for the purpose of producing a corresponding plate effect useful for the measurement and indication of mutual conductance.

Further objects and advantages of the invention will be apparent to those skilled in the art.

In the drawing, the view represents a diagram of one form of apparatus suitable for practice of the invention.

Since all standard electron tubes used in radio receiving sets or for like purposes are operated with the application of direct current of positive potential to the plate and of negative potential to the grid, the present apparatus is designed to supply such current at any standard or desired values, the primary power source in this instance being any ordinary or usual alternating current source. In the arrangement shown in the drawing, the apparatus includes a multiple transformer, the primary P of which is provided with the leads 10 adapted for connection to the alternating current source. The instrument may be designed, by proper winding of its coils, for connection to any alternating current source, with any desired voltage and frequency, and for convenience of illustration may be assumed to be designed for connection to a standard 110 volt 60 cycle alternating current source. It is preferably provided with any suitable means, such as the adjustable resistance $R_1$, for the purpose of taking account of any possible fluctuations in main line voltage and insuring that the voltage applied to the instrument is the exact predetermined voltage for which it is designed, say 100 volts in the instance under consideration, but always less than the minimum voltage of the line. In other words, all the parts of the instrument to be described are designed in advance with predetermined characteristics so that accurate measurement and indication are produced when exactly 100 volts alternating current is applied to the primary; and whatever be the actual input alternating current voltage, such voltage is reduced by the adjustable resistance $R_1$ to the predetermined or chosen voltage for which the instrument is designed.

Coupled to the primary P are a plurality, five being shown, of secondaries, $S_1$, $S_2$, $S_3$, $S_4$ and $S_5$.

Secondaries $S_1$, $S_2$ energize a rectifier tube 2, the secondary $S_1$ being designed to produce the necessary voltage for the filament of the tube, say 5 volts. To a center tap from this secondary is connected a suitable choke or inductance $L_1$, which is introduced into the circuit for the purpose of suppressing the alternating current ripple and to produce a more nearly constant direct current voltage from the rectifier tube. The secondary $S_2$ is center tapped and is used to supply the plates of the rectifier tube and may be wound, for example, to produce a desirable high voltage on said plates of say 300 volts, as will be readily understood.

Across the filament and plates of the rectifier tube, and through the choke $L_1$, is connected a suitable resistor usually tapped to provide any suitable or desired voltages for application to the tube to be tested. The said resistor may be subdivided if desired to produce any number of different voltages, but for convenience, and for simplicity of illustration, has been shown subdivided into three elements, $R_2$, $R_3$ and $R_4$, the first two supplying positive potential to the plate and element $R_4$ supplying negative potential to the grid, as will appear. The positive resistor elements $R_2$, $R_3$ are shunted by a condenser $C_1$ of relatively large capacity, such as 12 microfarads, and the third resistor element $R_4$ is likewise shunted by a similar high capacity condenser $C_2$ with a value on the order of 12 microfarads. These condensers $C_1$, $C_2$, serve to further reduce the ripple or alternating current component of the output of the rectifier tube, actually causing it to produce direct current with negligible alternating current ripple or component. The direct current voltage thereby obtained from the rectifying system under load, in the instance described, is on the order of 210 volts, but this voltage is capable of variation by proper design of the apparatus and may be of higher or lower value in order to test tubes requiring higher or lower voltages upon the plate. In the arrangement shown resistors $R_2$ and $R_3$ may have a value of say 2000 ohms each and resistor $R_4$ of 700 ohms.

The arrangement so far described supplies an adjustable or variable source of positive potential for the plate of the tube to be tested.

Secondary $S_3$ is for the purpose of energizing or operating the filament of the tube to be tested. Preferably this secondary is constructed with a number of taps for securing various voltages for adapting the apparatus of different types of tubes to be tested and requiring different filament voltages. By proper design and subdivision of taps any number of different types of tubes may therefore be tested in the same instrument.

The grid voltage is applied to the grid from the negative potential resistor $R_4$ through an adjustable contact 6, as shown, so that any desirable negative potential may be applied to the grid.

The testing apparatus is provided with suitable connections for the tube 3 under test, such as any standard socket provided with the necessary terminals for the various tube electrodes, such as filament, cathode, grid and plate and with connections for a shield grid lead, as is usual. The plate current from the rectifier tube is conducted to the plate of the tube through a direct current milliammeter 4 of any suitable type adapted to accurately measure and indicate the direct current milliamperes consumed by the tube.

The plate current is also carried to the plate of the tube through an alternating current milliammeter marked generally 5, which is of special form constructed not only to operate as a milliammeter, but also as a voltmeter, for purposes which will appear, as follows:

This instrument 5 consists essentially in its internal construction of two coils $L_2$, $L_3$, the coil $L_2$ being a fixed coil in series with a resistance $R_6$ and $L_3$ being a movable coil in series with a resistance $R_5$ and mounted in suitable bearings so that it revolves easily with negligible friction and being also mounted to operate a pointer 1 travelling over a suitable scale A. The movable coil $L_3$ rotates in and is operated by the magnetic field of the stationary coil $L_2$ and is normally brought to an initial or zero position by suitable control springs well known in the art and not illustrated. Movable coil $L_3$ is energized by alternating current transmitted to it from the secondary $S_5$ by way of resistance $R_5$, the values of resistances $R_5$, $R_6$ being so chosen that when a predetermined alternating current voltage from the secondary $S_5$, as the result of the desired standard alternating current voltage applied to the primary by adjustment of resistance $R_1$, is applied to the instrument 5, and coil $L_2$ is energized, the pointer 1 will move to a predetermined position indicated on the scale, such, for example, as the dotted line position shown in the drawing. The instrument 5 is also in circuit with two switches $SW_1$ and $SW_2$, the purposes of which will appear.

Switch $SW_2$ is for the purpose of applying selectively any desired direct current potential to the plate of the tube, and while shown as capable of adjustment to either of two positions, may be adjustable to more than two positions, as stated.

Switch $SW_1$ has a manually operable member 11 by which its contacts may be moved to either of two positions. In the first position the arm 11 is depressed, so as to conductively connect the blades $B_1$, $B_2$, $B_3$ of the switch, blade $B_4$ being out of circuit. This is the position of the parts when the instrument 5 operates as a voltmeter.

In the second position, when the member 11 is raised, blades $B_3$ and $B_4$ are conductively connected to each other and blades $B_1$ and $B_2$ are disconnected from each other and from the remaining blades. This is the position of the parts when the instrument 5 operates as an alternating current milliammeter.

In the first of said positions of switch $SW_1$, the plate current delivered from switch $SW_2$ to the blade $B_3$ is shunted around the instrument 5, passing to blade $B_2$ and thence directly to the direct current milliammeter 4. The alternating current voltage supplied by the secondary $S_5$ flows through both of the coils $L_2$, $L_3$, the former being then in series with resistance $R_6$ and, as stated, the two resistances $R_5$, $R_6$ are so chosen or designed that when the input voltage impressed on the primary P is of the desired value, the pointer 1 will move to the dotted line position in the drawing. Therefore, by moving switch $SW_1$ to its first position, the instrument 5 may be used to calibrate the apparatus as a whole by adjusting the resistance $R_1$ until the pointer 1 reaches the dotted line position shown in the drawing. All of the secondaries having been properly designed with reference to the same primary, the entire apparatus will then have been adjusted to the desired and predetermined standard condition.

In the second position of switch $SW_1$ direct current potential is applied from the switch $SW_2$ by way of the switch blades $B_3$, $B_4$, coil $L_2$ and the instrument 4 to the plate, while the alternating current potential supplied by the secondary $S_5$ flows only through the coil $L_3$ and resistance $R_5$. In this condition instrument 5 functions as a milliammeter.

Switch $SW_3$ is a simple switch in the cathode circuit of the tube to be tested.

As stated, the contact 6 by which negative potential is applied to the grid is in series with the secondary $S_4$, so that alternating current potential of definite standard value, say two volts, in accordance with the standard adjustment of the resistance $R_1$, is impressed and maintaned at standard value upon the grid of the tube under test, resulting in the production of a corresponding alternating current component in the plate current depending upon the characteristics of the tube. Since the alternating current potential applied to the grid is maintained at a constant value, according to the design of the testing apparatus, the alternating current milliammeter may be calibrated directly in micromhos, as shown in the following equation:

$$\frac{\text{AC plate current}}{\text{AC grid volts}} = \text{mutual conductance}$$

Of course, by maintaining the plate current uniform the variation in grid voltage may also be utilized as a direct measure of mutual conductance, and the instrument may be so designed.

When the instrument 5 is operated as an alternating current milliammeter, with switch $SW_1$ in the second of its two positions, it reacts only to the alternating current component in the plate circuit, because the movable coil $L_3$ is energized only by the alternating current potential impressed upon it from the secondary $S_5$.

With the instrument described, it is apparent that by proper design of coils and other factors, the apparatus may be made suitable for testing any desired range of electron tubes; and in the test of each one thereof, by connection of the instrument to a source of the character of current for which it is designed, such as 110 volt, 60 cycle, alternating current or the like, by adjustment of the resistance $R_1$ the entire testing apparatus may be brought to predetermined standard conditions which may be reproduced at every setting up of the instrument for test, regardless of line fluctuations. When so calibrated or standardized, the instrument accurately measures and directly indicates both the direct current supplied to the plate and the mutual conductance of the tube, avoiding any necessity for calculations or the like.

Further advantages will be apparent to those skilled in the art.

What I claim is:—

Electron tube testing apparatus, comprising a multiple transformer provided with a primary coil adapted for connection to an alternating current source and provided with means for adjusting the applied potential, a plurality of secondary coils each designed to produce standard output upon adjustment of the primary circuit to a standard applied potential, rectifying means connected to certain of said secondaries and provided with means for supplying predetermined direct current potentials, said rectifying means and certain of said secondaries including means for connection to the circuits of a tube to be tested for applying direct current and alternating current potentials to its electrodes, one of said secondaries being provided with means to supply alternating current potential to the grid circuit, an electrical measuring instrument provided with means whereby it may be operated either as an alternating current milliammeter or as a voltmeter, means for connecting the same to the plate circuit of the tube to be tested, connections between said instrument and another of said secondaries, and means for adjusting the alternating current potential applied from the alternating current source to the primary coil.

ROBERT D. HICKOK.